E. I. FLETCHER.
DOUGH BOARD.
APPLICATION FILED MAR. 13, 1916.
1,212,040.
Patented Jan. 9, 1917.
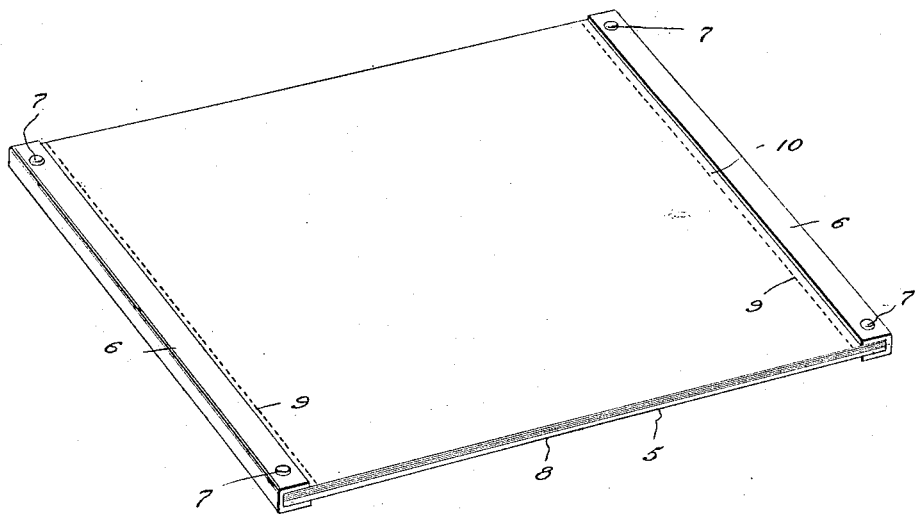
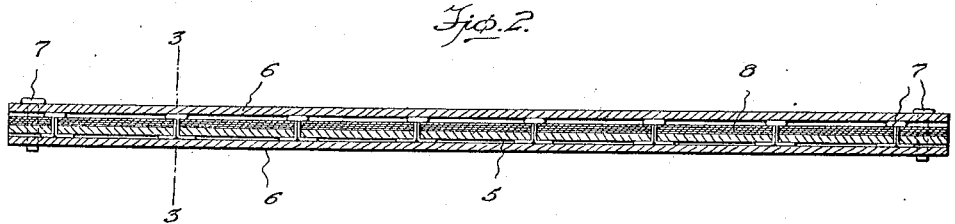
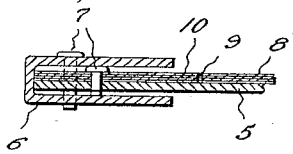
Inventor
E. I. Fletcher.
Witnesses
Paul M. Hunt
Nancy A. Minnett
By John Louis Waters & Co
Attorney

UNITED STATES PATENT OFFICE.

ELIZABETH IDA FLETCHER, OF NORWICH, CONNECTICUT.

DOUGH-BOARD.

1,212,040.     Specification of Letters Patent.     Patented Jan. 9, 1917.

Application filed March 13, 1916. Serial No. 83,854.

*To all whom it may concern:*

Be it known that I, ELIZABETH I. FLETCHER, a citizen of the United States, residing at Norwich, in the county of New London and State of Connecticut, have invented certain useful Improvements in Dough-Boards, of which the following is a specification, reference being had therein to the accompanying drawing.

This invention relates to improvements in dough boards, one object of the invention being the provision of a sanitary board which is covered with a plurality of sheets of impervious material, such as paraffined paper, that may be torn off one sheet at a time to present a succeeding clean sheet for next use.

A further object of this invention is the provision of a dough board that dispenses with the usual wooden board, the main body being made of some substantially rigid body, such as heavy card or bristol board, covered with a plurality of removable waxed or paraffined sheets of dough receiving papers, such sheets being perforated at their ends to permit of the easy removal thereof.

A still further object of this invention is the provision of a dough board, which is simple, sanitary and inexpensive in construction and practical and efficient in use.

In the accompanying drawings:—Figure 1 is a perspective view of the complete dough board made according to and embodying the present invention. Fig. 2 is a longitudinal section through one end thereof, and Fig. 3 is a cross section on line 3—3 of Fig. 2.

Referring to the drawings, the numeral 5 designates the body of the board, which is preferably of heavy card board, or may be of light sheet metal. At each end is secured the cleat strip 6, which also may be made of metal or paper, it being secured in place by fastening devices 7, so that the sheets 8, of paraffined or waxed paper may be stretched over the surface of the body 5, and held taut. Each sheet is perforated at each end as at 9, so that when one sheet has been used, it may be torn off to present the next succeeding sheet. It will be noted that the perforations are close to the edges of the cleat strips 6, so that the working surface of each sheet is removed, and the stubs 10 left so that all sheets are held with the same advantage as the others.

With a dough board of this type, a sanitary utensil for the housewife and cook is provided, and the same can be made of cheap materials so as to permit the body 5 when depleted of the sheets 8 to be cast away. This form of board is also relatively light in weight and thin, as compared with the usual unsanitary wooden board.

What I claim, as new, is:—

The combination with a pair of channeled members constituting cleats, of a board having a plurality of perforations arranged in rows near opposite edges thereof, a plurality of impervious sheets superimposed upon the board and having weakened lines spaced from opposite edges thereof, and bendable fastening devices passed through the sheets and engaged in the openings in the board and also within the channels in the cleats which are detachably engaged with said sheets and board.

In testimony whereof I affix my signature.

ELIZABETH IDA FLETCHER.

Copies of this patent may be obtained for five cents each, by addressing the "Commissioner of Patents, Washington, D. C."